US012775242B2

(12) United States Patent
Balmer

(10) Patent No.: US 12,775,242 B2
(45) Date of Patent: Oct. 27, 2026

(54) RESILIENT CASING RING FOR CASING A HOROLOGICAL MOVEMENT AND WATCH CASE COMPRISING SUCH A RESILIENT CASING RING

(71) Applicant: ETA SA MANUFACTURE HORLOGÈRE SUISSE, Grenchen (CH)

(72) Inventor: Raphaël Balmer, Vicques (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 255 days.

(21) Appl. No.: 18/486,492

(22) Filed: Oct. 13, 2023

(65) Prior Publication Data

US 2024/0201631 A1 Jun. 20, 2024

(30) Foreign Application Priority Data

Dec. 15, 2022 (EP) .................................... 22213671

(51) Int. Cl.
*G04B 37/05* (2006.01)
*G04B 37/22* (2006.01)

(52) U.S. Cl.
CPC ............. *G04B 37/05* (2013.01); *G04B 37/22* (2013.01)

(58) Field of Classification Search
CPC ...... G04B 37/05; G04B 37/22; G04B 37/052; G04B 37/04; G04B 43/002; G04B 31/02
See application file for complete search history.

(56) References Cited

U.S. PATENT DOCUMENTS

| | | | | |
|---|---|---|---|---|
| 2,418,999 A | | 4/1947 | Williams | |
| 3,633,356 A | * | 1/1972 | Kitazima | G04B 37/052 368/299 |
| 2017/0261937 A1 | * | 9/2017 | Merino | G04B 31/04 |

(Continued)

FOREIGN PATENT DOCUMENTS

| | | | | |
|---|---|---|---|---|
| CH | 707 400 A2 | | 6/2014 | |
| CH | 707400 B1 | * | 8/2017 | G04B 37/05 |
| CN | 217100606 U | | 8/2022 | |

(Continued)

OTHER PUBLICATIONS

European Search Report for EP 22213671 dated May 25, 2023.

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A resilient casing ring (200) for casing a horological movement (10) inside a watch case (100) including a middle (110). The casing ring (200) includes an annular body (205) with a central axis (Z), and fastening tabs (210) carried by the annular body (205) and cooperating with the middle (110) to form a bayonet casing system (300) by rotation of the resilient casing ring (200) relative to the middle (110) about the central axis (Z), between an insertion position and a locked position. The casing ring (200) includes resilient retaining element cooperating with the horological movement (10) and exerting an axial force parallel to the central axis (Z) on the horological movement (10) by elastic deformation of the resilient retaining element when the resilient casing ring (200) is in the locked position in the middle (110).

17 Claims, 5 Drawing Sheets

(56) References Cited

U.S. PATENT DOCUMENTS

| | | | | |
|---|---|---|---|---|
| 2018/0032034 | A1* | 2/2018 | Vuille | G04B 47/04 |
| 2019/0187619 | A1* | 6/2019 | Wahler | G04B 37/0041 |

FOREIGN PATENT DOCUMENTS

| | | | | |
|---|---|---|---|---|
| CN | 222014638 | U | 11/2024 | |
| EP | 3396473 | A1 * | 10/2018 | G04B 37/052 |
| EP | 3719582 | A1 * | 10/2020 | G04B 29/00 |
| FR | 2 412 102 | A1 | 7/1979 | |
| JP | 46-24305 | Y | 8/1971 | |
| JP | 49-6114 | Y | 2/1974 | |
| JP | 50-44770 | Y | 12/1975 | |
| JP | S54 162267 | U | 11/1979 | |
| JP | 10-239454 | A | 9/1998 | |
| JP | 11-118952 | A | 4/1999 | |
| JP | 2000-162332 | A | 6/2000 | |
| JP | 2019-109226 | A | 7/2019 | |
| KR | 10-2019-0074985 | A | 6/2019 | |

* cited by examiner

RESILIENT CASING RING FOR CASING A HOROLOGICAL MOVEMENT AND WATCH CASE COMPRISING SUCH A RESILIENT CASING RING

CROSS-REFERENCE TO RELATED APPLICATIONS

This application claims priority to European Patent Application No. 22213671.5 filed Dec. 15, 2022, the entire contents of which are incorporated herein by reference.

TECHNICAL FIELD OF THE INVENTION

The invention relates to casing devices for fastening a horological movement inside a watch case.

The invention further relates to a watch case comprising a horological movement fastened to said case by a casing device.

The invention further relates to a watch comprising such a case.

The invention further relates to a method for casing a horological movement by means of the resilient casing ring according to the invention.

The invention further relates to a casing tool for locking and unlocking the resilient casing ring according to the invention.

TECHNOLOGICAL BACKGROUND

The casing of a horological movement, i.e. the fastening of the movement inside a watch case, is typically achieved by means of fastening clamps which are inserted into grooves provided along the internal circumference of the case, the assembly being rigidly connected by clamp screws. However, this solution is relatively complex to implement because of the large number of parts and the various manipulations required to place the clamps and screws, which greatly affects the productivity of such a casing solution.

Other casing solutions are also known and use an intermediate part, such as a casing ring or an enlarging ring, positioned around the horological movement so as to hold it in position when a back is screwed onto the case. Although this solution allows the movement to be fastened quickly, it requires a space to be provided between the horological movement and the case to receive the casing ring or unit, which limits the possible dimensions of the movement relative to the dimensions of the case.

Moreover, existing solutions do not really solve the issue of absorbing impacts to the horological movement.

There is thus a need to improve devices for casing a horological movement inside a case in order to address at least one of the aforementioned problems.

There is also a need to improve a method for casing a horological movement inside a watch case, and to provide such a method that does not suffer from the aforementioned limitations.

SUMMARY OF THE INVENTION

To this end, the invention relates to a casing device for fastening a horological movement inside a watch case, which device overcomes at least one of the aforementioned drawbacks.

According to the invention, such a casing device takes the form of a resilient casing ring for quickly securing a horological movement inside a watch case. Such a resilient casing ring according to the invention eliminates the need for a multitude of retaining clamps and clamp tightening screws, and thus eliminates the numerous manipulations required for the screws and the clamps.

The resilient casing ring according to the invention also provides a solution for damping the displacements of the horological movement in the event of an impact to the case of the timepiece.

In this context, the invention relates to a resilient casing ring for casing a horological movement inside a watch case comprising a middle, said resilient casing ring comprising an annular body with a central axis Z, and fastening tabs carried by said annular body and capable of cooperating with said middle to form a bayonet casing system by the rotation of the resilient casing ring relative to the middle about the central axis Z, between an insertion position and a locked position, said resilient casing ring comprising at least one resilient retaining element configured to undergo elastic deformation, said at least one resilient retaining element being capable of cooperating with said horological movement and of exerting an axial force parallel to the central axis Z on the horological movement by elastic deformation of said resilient retaining element when said resilient casing ring is in the locked position in the middle.

In addition to the features mentioned in the preceding paragraph, the resilient casing ring according to the invention can have one or more complementary features from among the following, considered either on an individual basis or according to any combination technically possible:

- the resilient casing ring comprises an angular locking member capable of cooperating with the horological movement or the middle to lock the locked position of the resilient casing ring in the middle against rotation;
- said angular locking member is capable of cooperating with the horological movement or the middle to form an angular positioning stop for said resilient casing ring;
- said resilient casing ring is made of a metal or polymer material;
- said at least one resilient retaining element is formed by the annular body;
- the resilient casing ring comprises a plurality of resilient retaining elements formed by resilient retaining lugs comprising a resilient portion connected to the annular body and shaped to undergo elastic deformation;
- said resilient portion comprises a free contact end having at least one portion that is axially offset, along the central axis Z, from the annular body, capable of bearing against the horological movement and of exerting an axial force parallel to the central axis Z on the horological movement by the elastic deformation of said resilient portion at least when said resilient casing ring is in the locked position in the middle;
- the resilient casing ring comprises a positioning coded element for assembling;
- the resilient casing ring comprises at least one recess, the shape whereof is adapted to cooperate with a casing tool;
- the resilient casing ring comprises a first recess configured to ensure rotation of the resilient casing ring and a second recess configured to ensure unlocking of said resilient casing ring, each of the recesses having a shape that is adapted to cooperate with a casing tool.

The invention further relates to a watch case comprising a middle, a resilient casing ring according to the invention and a horological movement cased in said middle by said resilient casing ring.

Preferably, the resilient casing ring is configured to form damping means for the horological movement in the event of impacts to the watch case, preferably in an axial direction parallel to the central axis Z.

Preferably, the middle comprises bayonet grooves, said bayonet grooves cooperating with said fastening tabs to form the bayonet casing system of the horological movement.

Preferably, the middle comprises at least one bearing surface for receiving said tabs for fastening the resilient casing ring in the insertion position thereof, which bear against said bearing surface.

Preferably, the resilient casing ring comprises an angular locking member and the middle comprises a resilient locking finger configured to cooperate with said angular locking member to ensure that the resilient casing ring is locked against rotation in the middle by resilient clipping or locking.

Preferably, the resilient casing ring comprises an angular locking member and the horological movement comprises a resilient locking finger configured to cooperate with said angular locking member to ensure that the resilient casing ring is locked against rotation in the middle by resilient clipping or locking.

The invention further relates to a watch comprising such a case.

The invention further relates to a casing tool for casing a horological movement inside a watch case according to the invention.

Preferably, the casing tool comprises at least one protruding element configured to cooperate with at least one recess in the resilient casing ring.

Preferably, the casing tool comprises protruding elements configured to cooperate with a plurality of recesses in said resilient casing ring, said protruding elements rotating said resilient casing ring when said casing tool is rotated by an operator, a controller or a robot.

Preferably, the casing tool comprises an unlocking pin configured to disengage said resilient locking finger when said casing tool is in position on the resilient casing ring so as to allow it to be unlocked and allow said horological movement to be disassembled.

The invention further relates to a casing method for fastening a horological movement inside a watch case by means of a resilient casing ring according to the invention, the watch case comprising a middle having a bearing surface and a plurality of bayonet grooves, said casing method comprising:

- a step of inserting said horological movement into the middle;
- a step of inserting said resilient casing ring over the horological movement;
- a step of fastening the horological movement to the middle, during which step the resilient casing ring is rotatably engaged about the axis Z, said fastening tabs engaging within a plurality of bayonet grooves in the middle during the rotation of the resilient casing ring until the resilient casing ring reaches a locked position thereof.

Preferably, the locked position is reached when the locking member of the resilient casing ring abuts against an angular positioning stop of the middle or of said horological movement.

Preferably, the step of fastening the movement is carried out using a casing tool comprising at least one protruding element cooperating with at least one recess in said resilient casing ring to rotatably engage the resilient casing ring when the casing tool is rotated by an operator, a controller or a robot.

The casing method can be manual, i.e. carried out by an individual, or automated.

BRIEF DESCRIPTION OF THE FIGURES

The purposes, advantages and features of the present invention will be better understood upon reading the detailed description given below with reference to the following figures:

FIG. 2 illustrating in particular the resilient casing ring in its inserted position;

FIG. 2 illustrating in particular the resilient casing ring in its locked position inside the middle;

In all the figures, common elements bear the same reference numerals unless specified to the contrary.

DETAILED DESCRIPTION OF THE INVENTION

Figure 1:
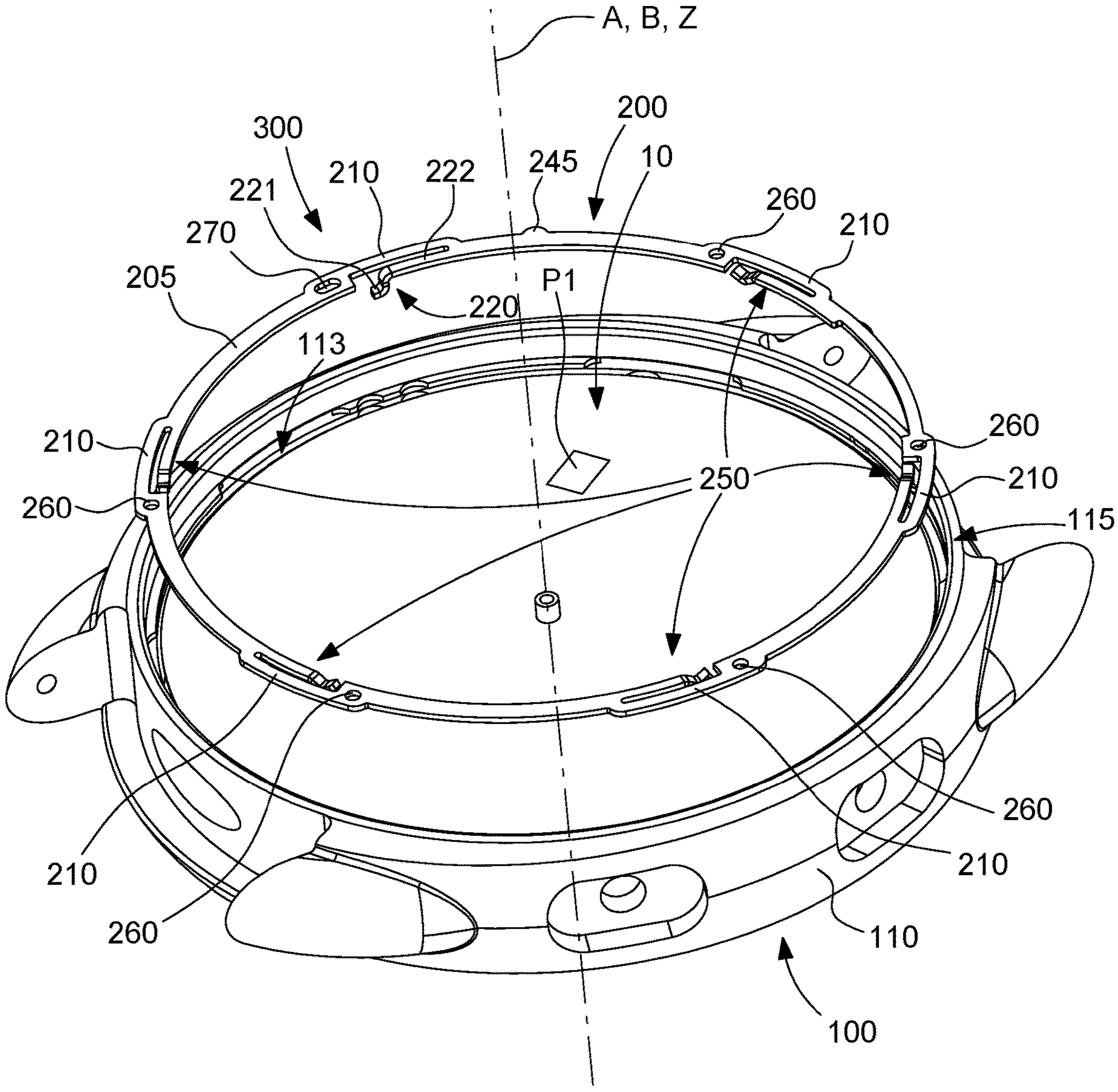
FIG. 1 is a semi-exploded, perspective view of a watch case according to the invention comprising a middle, a horological movement assembled in the middle and a resilient casing ring for fastening the horological movement inside the watch case.

FIG. 1 is a semi-exploded, perspective view of a case 100 having a central axis B according to the invention and comprising a middle 110 configured to be closed on either side by a case back (not shown) and by a crystal (not shown).

The watch case 100 comprises a horological movement 10 housed in the internal space 115 delimited by the middle 110.

For example, the middle 110 is made of a metal, ceramic or polymer material, or of a combination of different materials.

The horological movement 10 can be a mechanical, electromechanical or electronic movement.

The horological movement 10 has a central axis A perpendicular to a general plane P1. The general plane P1 of the horological movement 10 is parallel to the plane of the hands (not shown). The central axis A of the horological movement 10 is parallel or corresponds to the axis of rotation of the hands of the movement.

The central axis A of the horological movement 10 is parallel to or corresponds to the central axis B of the middle 110.

In the example embodiment shown, the horological movement 10 is cased up from the case back side. It goes without saying that the horological movement 10 can also be cased up from the crystal side while still remaining within the scope of the invention.

The main aim of the invention is to provide a casing device that facilitates the operation of casing the horological movement 10 inside the watch case 100.

To this end, the applicant proposes using a resilient casing ring 200 for fastening, securing and locking the horological movement 10 in the watch case 100.

The resilient casing ring 200 comprises an annular body 205 having a central axis Z and fastening tabs 210 extending in a radial direction, relative to the axial direction Z.

In the example embodiment shown, the central axis A of the horological movement 10 coincides with the central axis Z of the annular body 205 of the resilient casing ring. However, other configurations are also possible while still remaining within the scope of the invention.

Figure 2:
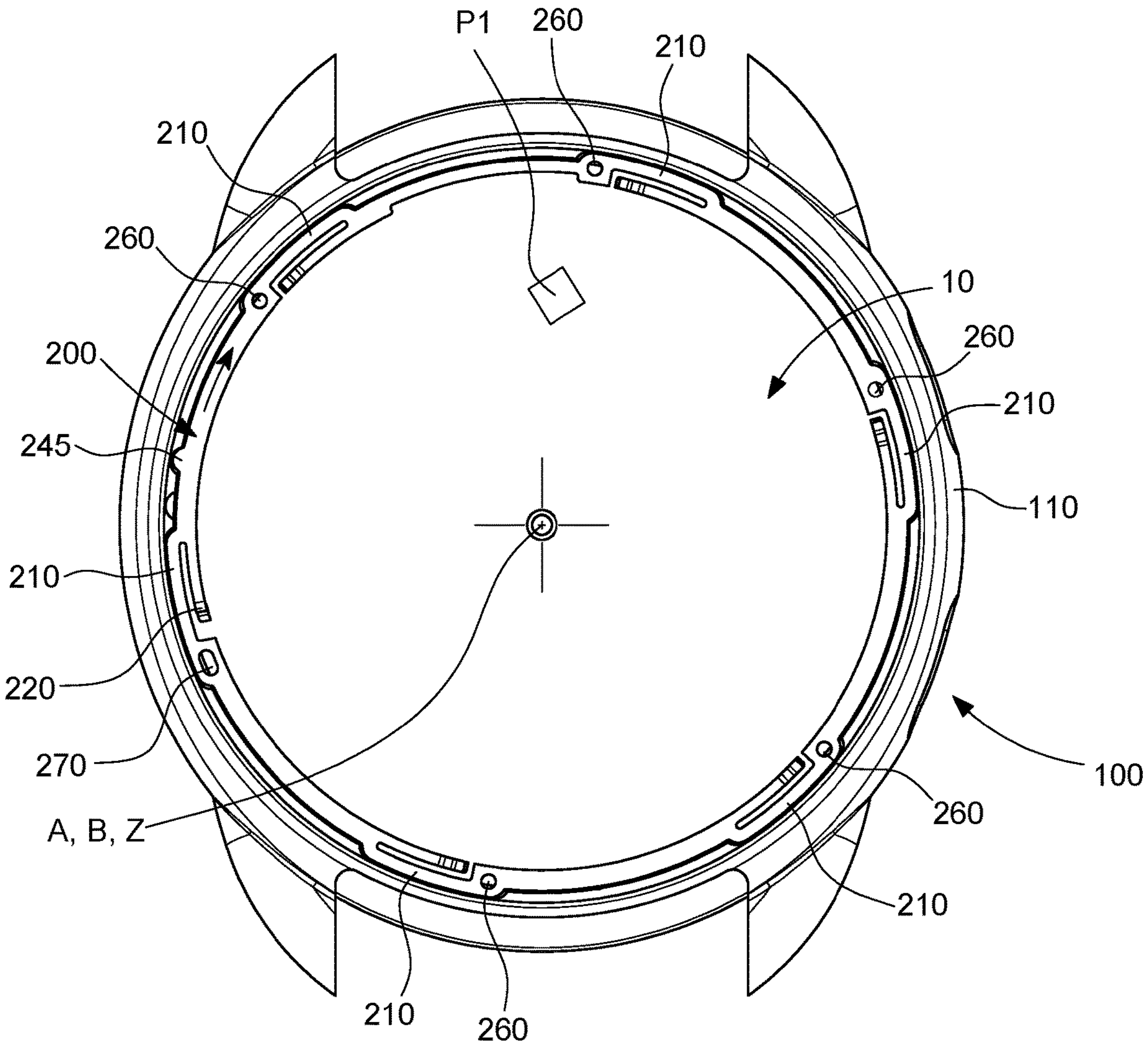
FIG. 2 is a top view of the watch case illustrated in FIG. 1.
Figure 3:
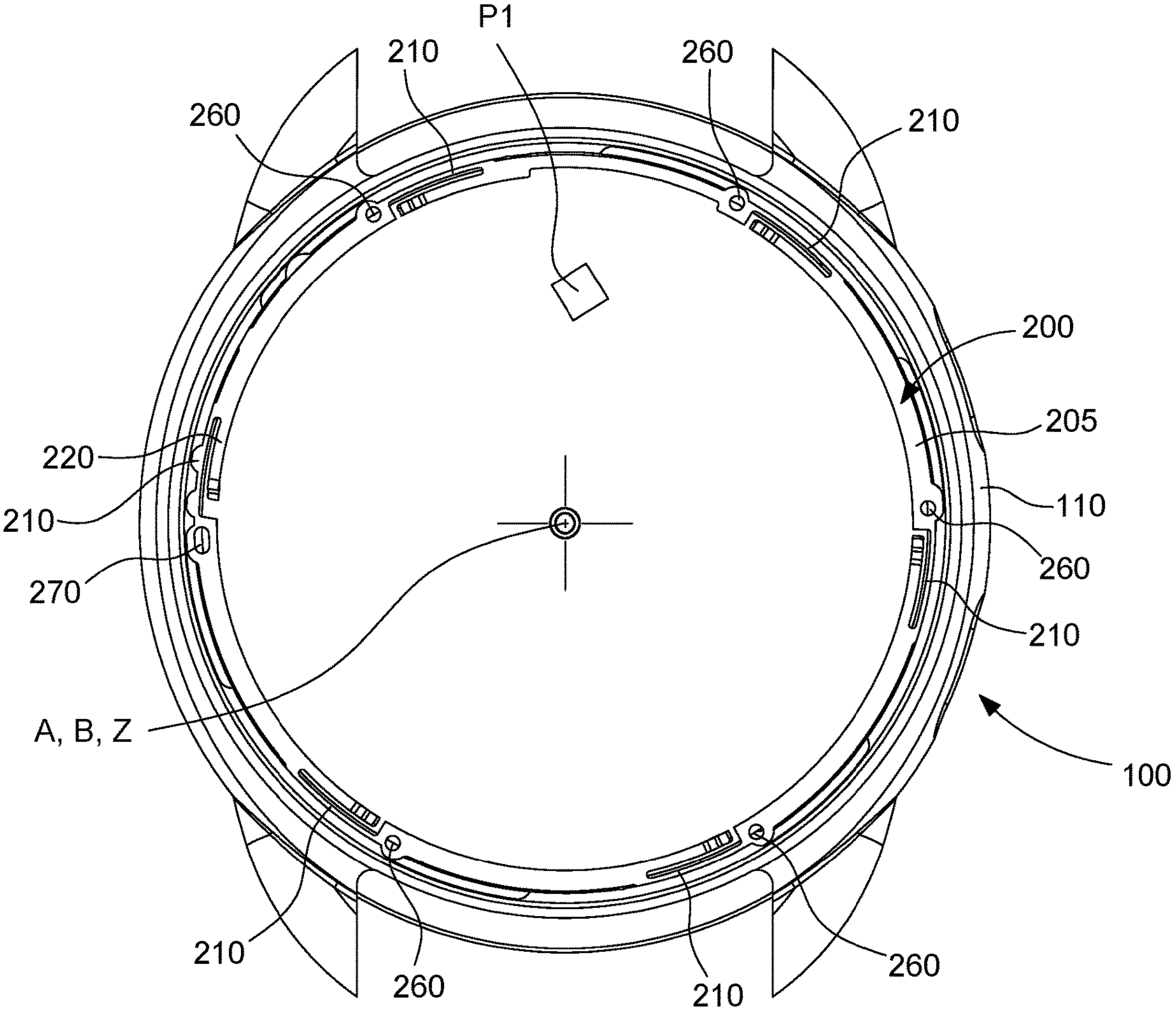
FIG. 3 is a top view of the watch case illustrated in FIG. 1.

FIG. 2 illustrates more particularly a top view of such a watch case 100 according to the invention, inside which the horological movement 10 is assembled and the resilient casing ring 200 is positioned above the horological movement 10 in an insertion position (i.e. not locked). From this insertion position of the resilient casing ring 200, rotation of the resilient casing ring 200 by a few degrees about the axis Z brings the resilient casing ring 200 into a locked position as shown in FIG. 3. This locked position ensures that the horological movement 10 is cased up.

By way of example, the locking direction is shown to be clockwise by an arrow on the resilient casing ring 200 illustrated in FIG. 2. However, the locking direction can also be counter-clockwise.

Advantageously, such a resilient casing ring 200 is made of a metal or polymer material.

Such a resilient casing ring 200 also has a damping function to attenuate the effects of the displacements of the horological movement 10, and mainly of the axial displacements along the axis Z in the event of impacts to the watch case 100.

However, the resilient casing ring 200 can also attenuate and damp the displacements of the horological movement 10 in the plane P1.

Advantageously, such a resilient casing ring is a resilient bayonet casing ring.

The fastening tabs 210 of the resilient casing ring 200 cooperate with bayonet grooves 113 made in the middle 110 to form a bayonet casing system 300. Such a bayonet locking system 300 allows the horological movement 10 to be cased up simply by rotating the resilient casing ring 200 relative to the middle 110 about the axis Z between an insertion position (not locked) and a locked position.

Figure 4:
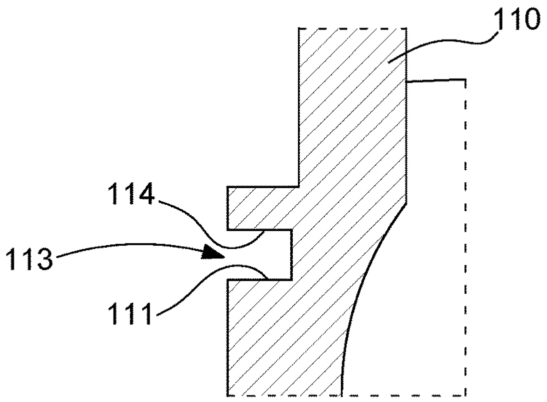
FIG. 4 shows a cross-sectional view of the middle according to the invention, which cross-section is made at a bayonet groove.

FIG. 4 illustrates a cross-sectional view of the middle 110, showing in particular a portion with a bayonet groove 113.

To receive the resilient casing ring 200, the middle 110 comprises a bearing surface 111 forming a circular shoulder extending along the inner periphery of the middle 110.

More specifically, when the resilient casing ring 200 is inserted into the middle 110, the fastening tabs 210 come to rest at least partially on the bearing surface 111 of the middle 110.

Generally speaking, the terms "internal", "inner", "external" and "outer" are of course to be understood relative to the axial direction Z illustrated in FIG. 1, which forms the central axis of the resilient casing ring 200; an "internal" element being closer to the central axis than an "external" element.

According to one alternative embodiment, a plurality of bearing surfaces 111 can be arranged and extend over angular portions of the inner periphery of the middle 110 and be distributed evenly, or otherwise, along the inner periphery of the middle 110. In this alternative embodiment, the number of bearing surfaces 111 would preferably be equal to the number of fastening tabs 210 of the resilient casing ring 200.

In the example embodiment shown, the resilient casing ring 200 comprises six fastening tabs 210. However, the number of fastening tabs 210 is not limited to six, and this number could be equal to two or an arbitrary number greater than two.

The bayonet grooves 113 are formed between the bearing surface 111 and a retaining surface 114 facing the bearing surface 111.

The number of bayonet grooves 113 is at least equal to the number of fastening tabs 210.

In the example embodiment illustrated, the bayonet grooves 113 are arranged in a plane parallel to the general plane P1 of the horological movement 10, i.e. in a plane perpendicular to the central axis A of the horological movement.

In an alternative embodiment, the bayonet grooves 113 can be arranged to include at least one portion that is inclined relative to the general plane P1 of the horological movement 10, so as to guide the rotation and translation of the fastening tabs 210, and thus impose a vertical displacement of the resilient casing ring, along the axis Z and towards the horological movement 10, when locking by rotation about the axis Z. For example, the bayonet grooves 113 can have at least one portion with a gradient that is directed towards the crystal of the case 100 (i.e. towards the side opposite that via which the horological movement 10 and the resilient casing ring 200 are inserted).

The space between the bearing surface 111 and the retaining surface 114 defines the width of the bayonet groove 113. It goes without saying that the width of the bayonet grooves 113 can be constant or variable, for example with a width at its widest at an insertion end portion to facilitate insertion of the fastening tabs 210, and a width at its narrowest at the bottom of the bayonet grooves 113, for example with a width close to, or corresponding to, the thickness of the fastening tabs 210 to further retain the fastening tabs 210 by rubbing or friction.

However, as will be seen hereinbelow, such an arrangement is not essential because the resilient casing ring 200 according to the invention comprises one or more resilient retaining elements acting elastically on the horological movement 10 and which will, by resilient counter-reaction, work to hold the fastening tabs 210 of the resilient casing ring 200 pressed against the retaining surface 114 at the bayonet grooves 113.

The bayonet grooves 113 can comprise a bottom, or an obstacle, for example a protuberance, to form an angular positioning stop for when the resilient casing ring 200 is rotating.

The resilient casing ring 200 comprises a locking member 220 which prevents the locking position of the resilient casing ring 200 from rotating. Such a locking member is configured to prevent the resilient casing ring 200 from accidentally loosening or unlocking, in particular in the event of an impact to the watch case 100.

According to one alternative embodiment, the resilient casing ring 200 comprises a plurality of locking members 220.

Figure 5:
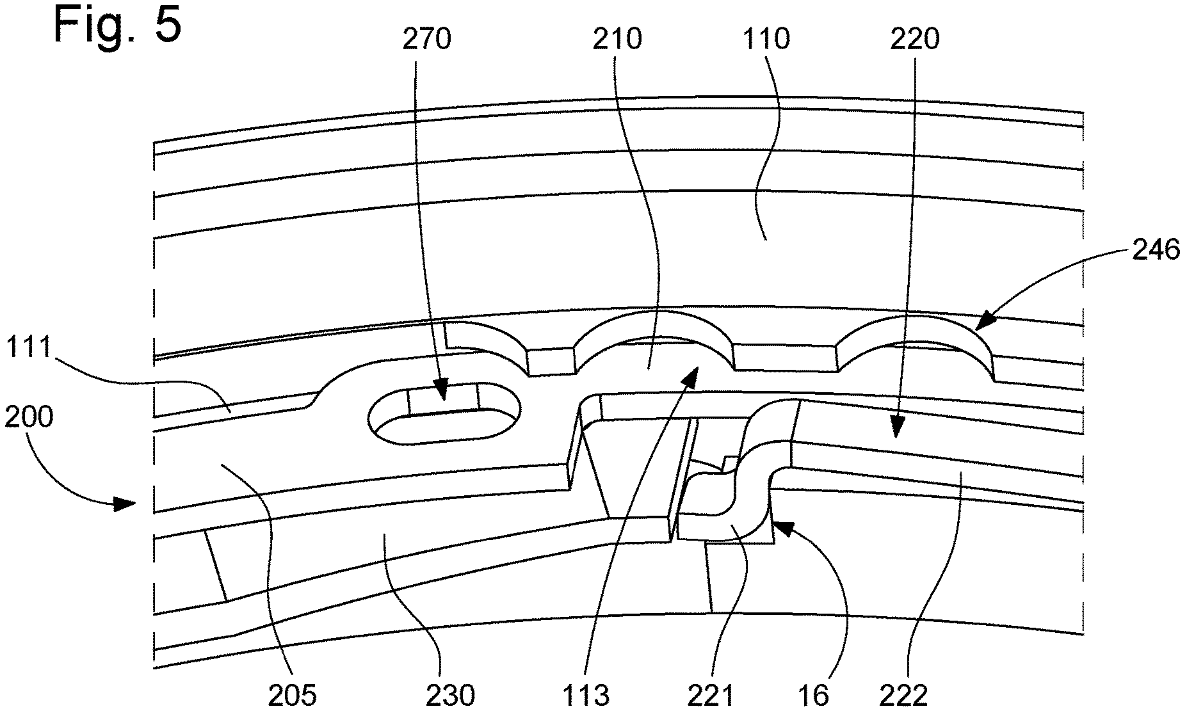
FIG. 5 is a detail view of the resilient casing ring according to the invention, illustrating more particularly an angular locking member of the resilient casing ring.

FIG. 5 illustrates a portion of the resilient casing ring 200 comprising a locking member 220.

In a first alternative embodiment, as illustrated, the locking member 220 has a portion 222 connected to the annular body 205 of the resilient casing ring 200 at a first end. The portion 222 has a free end 221, opposite the first end, which is axially offset along the axis Z relative to the annular body 205. The free end 221 thus protrudes from the annular body 205 of the resilient casing ring 200, and is directed towards the horological movement 10.

The locking member 220 is configured to cooperate with a resilient locking finger 230 provided on the middle 110 or on the horological movement 10. Such a resilient locking finger 230 is shaped to prevent the resilient casing ring 200 from unlocking by rotating when the latter is in the abutted position. The resilient casing ring 200 is thus in the locked position.

In a second alternative embodiment, the angular locking member 220 can take the form of an asperity, for example a hole, provided at least in the lower surface of the annular body 205 (i.e. in the surface intended to face the horological movement 10). The asperity may or may not be through-going. The resilient locking finger 230 provided on the middle 110 or on the horological movement 10, is thus shaped to fit at least partially into the asperity so as to prevent the conductive resilient ring 200 from counter-rotating when coming into abutment. The ring is thus in the locked position.

In the example embodiment illustrated, the resilient locking finger 230 belongs to the horological movement 10, the horological movement 10 being locked against rotation in the middle 110 by catches, bars or ad hoc means cooperating with slots formed in the inner periphery of the middle 110. These means also allow a positioning coded element for assembling (assembly key) to be formed in order to guarantee the correct positioning and orientation of the horological movement 10 in the middle 110 when casing the horological movement 10.

As illustrated in FIG. 5, the locking member 220 of the resilient casing ring 200 can also form an angular stop for positioning the resilient casing ring 200 by coming into contact with a stop surface 16 of the middle 110 or of the horological movement 10, which eliminates the need to produce one or more angular stops in the grooves 113 in the middle 110. The manufacture of such a middle 110 is thus simplified.

The locking member 220 and the resilient locking finger 230 form rotation-prevention means by the resilient clipping of the resilient casing ring 200. The rotation-prevention means are reversible and can be unlocked by means of a point or an assembly/disassembly tool allowing the resilient locking finger 230 to be stressed and deformed elastically, in this case in an axial direction parallel to the axis Z, in order to release the locking member 220 and the rotation of the resilient casing ring 200, in a direction for unlocking and disassembling the resilient casing ring.

The resilient locking finger 230 functions as a disengageable element. It is configured so as to be inactive when the resilient casing ring 200 is being assembled and to prevent the ring from counter-rotating once it is in the locked position (normal operating position of the watch).

More particularly, in the alternative embodiment illustrated, the resilient locking finger 230 is shaped so that, when it is in the free position, its end is positioned axially above the portion of the free end 221 of the locking member 220 located axially the furthest from the annular body 205.

The resilient locking finger 230 can be made of either a polymer or metal material.

The resilient casing ring 200 further comprises at least one resilient retaining element configured to exert an axial force on the horological movement 10, along an axis parallel to the axis Z of the horological movement 10, by elastic deformation.

According to a first alternative embodiment, the resilient retaining element can be formed by the annular body 205 of the resilient casing ring 200. The annular body 205 of the resilient casing ring 200 is preferably a resilient member configured to bear against the horological movement 10 and to deform elastically so as to exert a resilient axial force on the horological movement once in the locked position in the middle 110.

According to a second alternative embodiment, the resilient retaining element is formed by a plurality of resilient retaining lugs 250.

Figure 6:
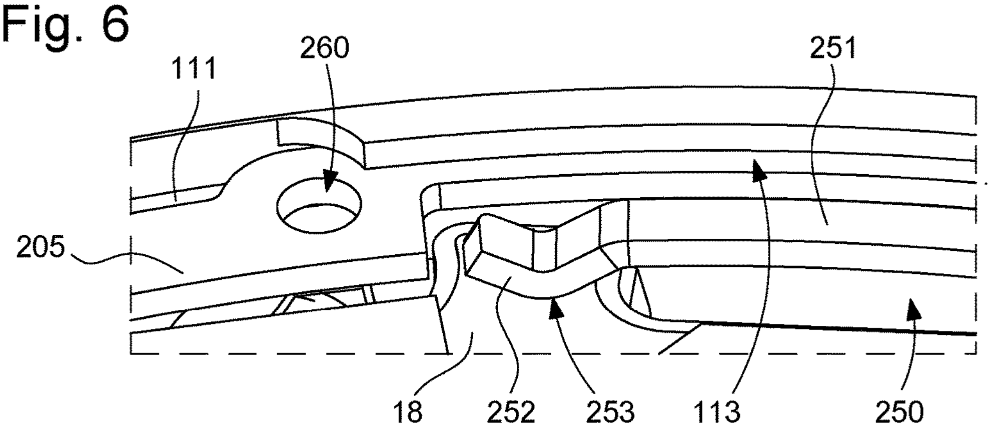
FIG. 6 is a detail view of the resilient casing ring according to the invention, illustrating more particularly a resilient retaining lug of the resilient casing ring.

FIG. 6 illustrates in particular a portion of the resilient casing ring 200 at one of the resilient retaining lugs 250.

The resilient retaining lugs 250 comprise a resilient portion 251 connected to the annular body 205 of the resilient casing ring 200 at a first end. This resilient portion 251, which for example takes the form of a blade, is intended to deform elastically relative to the annular body 205 of the resilient casing ring 200. The resilient portion 251 comprises a free contact end 252, at least one portion 253 whereof is axially offset relative to the annular body 205 of the resilient casing ring 200 and to the fastening tabs 210, along the axis Z. The free contact end 252 thus protrudes from the annular body 205 of the resilient casing ring 200 towards the horological movement 10.

Advantageously, the free contact ends 252 of the resilient retaining lugs 250 and the free end 222 of the locking member 220 are provided at different heights relative to the plane formed by the annular body 205.

The free contact ends 252 of the resilient retaining lugs 250 are configured to bear against the horological movement 10, preferably at dedicated bearing portions 18, and to exert a force on the horological movement 10 when the resilient casing ring 200 is in the locked position inside the middle 110.

Preferably, the free contact ends 252 of the resilient retaining lugs 250 are configured to exert an axial force parallel to the central axis Z on the horological movement 10 when the resilient casing ring 200 is in the locked position inside the middle 110.

The resilient retaining lugs 250 allow the horological movement 10 to be stressed in the middle 110 to hold it in position inside the middle 110 during normal use, while forming absorption or damping means attenuating the displacements of the horological movement 10 in the event of an impact to the watch case 100.

In the example embodiment illustrated, the resilient retaining lugs 250 axially stress the horological movement 10 along the axis Z in order to attenuate the effects of the axial displacements of the horological movement 10 along this axis.

The dedicated bearing portions 18 of the horological movement 10 can comprise asperities, for example hollows, i.e. surfaces set back from an upper surface of the horological movement 10, which asperities are configured to receive and house the resilient retaining lugs 250.

These asperities on the horological movement 10 can also form angular positioning stops for the resilient casing ring 200, give an indication of the positioning of the resilient casing ring 200 and/or participate in locking the resilient casing ring 200 in the locked position.

The resilient retaining lugs 250 housed in these asperities can also prevent the horological movement 10 from being displaced in the plane P1 and/or damp or attenuate the displacements of the horological movement 10 in the plane P1.

The resilient casing ring 200 further comprises at least one positioning coded element 245 cooperating with a cavity 246 formed in the middle 110 and extending axially along the axis Z.

The resilient casing ring 200 further comprises a recess 260, preferably at least two, configured to cooperate with protruding elements 460 such as protuberances, pins or catches, of a casing tool 400 for assembling (locking) and disassembling (unlocking) the resilient casing ring 200.

In the example embodiment shown, the resilient ring comprises five recesses 260.

The recesses 260 can be holes or notches, etc.

The casing tool 400 comprises a body 410 to facilitate the handling, locking and unlocking of the resilient casing ring 200.

Figure 7:
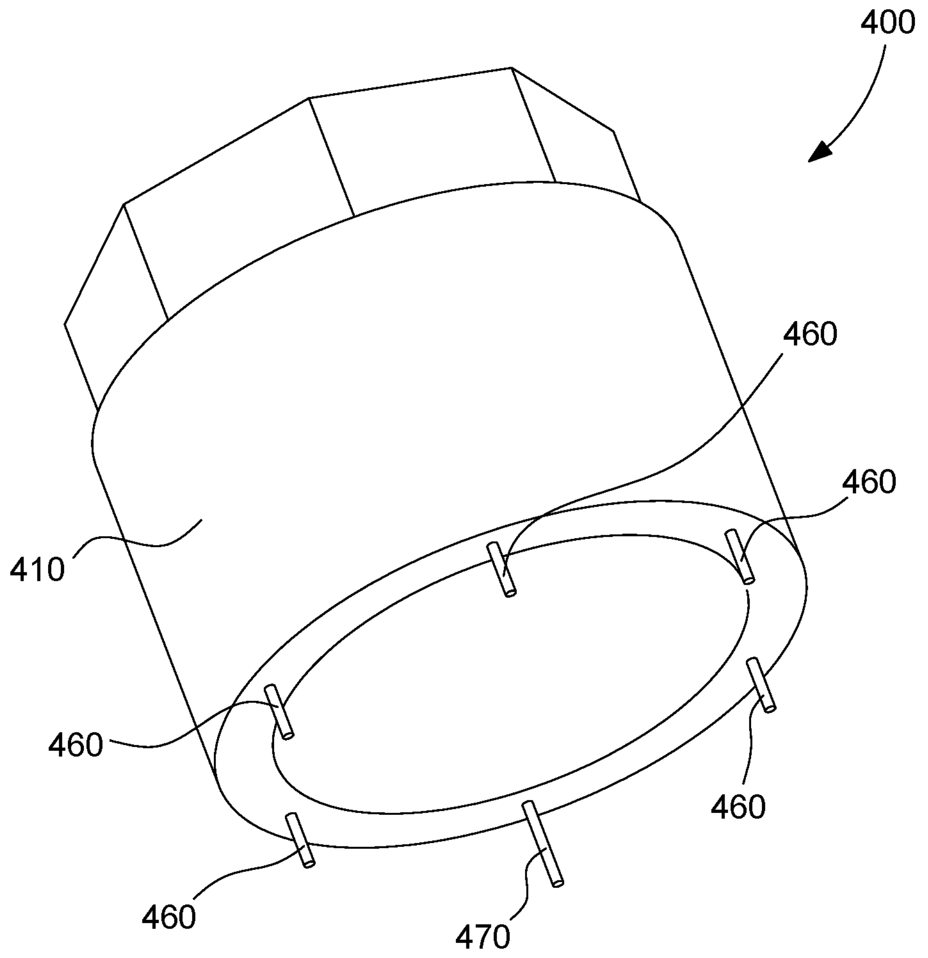
FIG. 7 is a diagrammatic view of an assembly/disassembly tool for casing a horological movement by means of the resilient casing ring according to the invention.

FIG. 7 diagrammatically illustrates such a casing tool according to the invention for the operation of casing the horological movement 10 using the resilient casing ring 200 according to the invention.

The casing tool 400 can take the form of a sleeve that is easily gripped by a watchmaker and has at least one pin 460 configured to fit into said at least one cavity 260 in the resilient casing ring 200.

In the example embodiment shown, the casing tool 400 comprises five pins 460 configured to fit into the five cavities 260 in the resilient casing ring 200.

The resilient casing ring 200 further comprises a disassembly recess 270 configured to receive and allow an unlocking pin 470 of the casing tool 400 to pass. Such a disassembly recess 270 preferably has a specific shape that differs from that of the other recesses 260, in particular to make it easier to identify compared to the other recesses. It goes without saying that other means can be used to easily identify the disassembly recess 270 compared to the other recesses 260 used to rotate the resilient casing ring 200.

The disassembly recess 270 is, for example, an oblong hole or notch, whereas the recesses 260 can be circular in shape.

The disassembly recess 270 is formed in the annular body 205 so as to be positioned above the resilient locking finger 230 when the resilient casing ring 200 is in the locked position in the middle 110.

The unlocking pin 470 of the casing tool 400 is configured to disengage the resilient locking finger 230 when the casing tool 400 is positioned on the resilient casing ring 200. The unlocking pin 470 is configured to press and elastically deform the resilient locking finger 230 so as to release it from the locking member 220 or remove it from the trajectory of the locking member 220, thus allowing the resilient casing ring 200 to counter-rotate.

Thus, once the casing tool 400 is in position on the resilient casing ring 200, it is easy to disassemble the resilient casing ring 200 simply by rotating the tool in the opposite direction to the direction of assembly, which causes the resilient casing ring 200 to rotate as a result of the cooperation of the pins 460 and the recesses 260.

Advantageously, in the insertion position of the resilient casing ring 200, i.e. in the position in which the resilient casing ring 200 is just resting on the bearing surface 111 of the middle 110 (the fastening tabs 210 not being engaged in the bayonet grooves 113), the resilient retaining lugs 250 are not in contact with the various bearing portions 18 of the horological movement. The resilient retaining elements 250 exert a force, in particular an axial force, on the horological movement only when the resilient casing ring 200 is in the locked position.

Method for Casing a Horological Movement According to the Invention

To case the horological movement 10, a first operation consists of inserting the horological movement 10 into the middle 110 so that the various indexing elements of the movement 10 and of the middle 110 line up. The horological movement 10 can thus be installed in a predefined angular position relative to the middle 110. The various indexing elements pre-hold the horological movement 10 in rotation in the middle 110, relative to the axis Z.

In the example embodiment shown, the horological movement 10 is inserted from the case back side.

A second operation then consists of inserting the resilient casing ring 200 above the horological movement 10 until the fastening tabs 210 come to bear against the bearing surface 111 of the middle 110.

According to one alternative embodiment, the resilient casing ring 200 can be deposited directly onto the horological movement 10.

A third operation consists of imparting a rotation on the resilient casing ring 200 in a determined locking direction, for example in the clockwise direction, so that the fastening tabs 210 are inserted into the bayonet grooves 113, until they reach a stop position thanks to the one or more angular positioning stops. The resilient casing ring 200 is thus in the locked position. In the example embodiment described hereinabove, the locking member 220 of the resilient casing ring 200 cooperates with a stop surface 16 of the horological movement 10 to form an angular positioning stop for the resilient casing ring 200.

During rotation, the operator may have to overcome a resisting force due to the elastic deformation of one or more resilient retaining elements of the ring 200.

For example, during rotation, the operator may have to overcome a resisting force due to the elastic deformation of the annular body 205 and/or of the resilient retaining lugs 250 coming into contact with the horological movement 10 during rotation of the ring 200, and/or overcome the resisting force caused by the friction of the annular body 205 and/or of the resilient retaining lugs 250 in contact with the horological movement 10.

The operator may also need to apply an axial force along the axis Z to the resilient casing ring 200 so as to elastically stress the annular body 205 and/or the resilient retaining lugs 250 in order to engage the fastening tabs 210 in the grooves 113.

Preferably, the resilient casing ring 200 is rotated using the casing tool 400 according to the invention described hereinabove. Such a casing tool 400 facilitates the handling of such a resilient casing ring 200 according to the invention.

To this end, the method can comprise a prior step consisting of positioning the casing tool 400 on the resilient casing ring 200 by lining up the various pins 460, 470 of the casing tool 400 with the various respective recesses 260, 270 in the resilient casing ring 200.

During rotation of the resilient casing ring 200, the free end 221 of the locking member 220 comes into contact with the resilient locking finger 230, gradually deforming it elastically as the ring 200 rotates or as soon as the conductive resilient ring 200 is positioned above the horological movement 10. When the resilient casing ring 200 reaches its final angular position (stop position), the resilient locking finger 230 is no longer stressed, and can return to its free rest position, so as to cooperate with the locking member 220, thus preventing the resilient casing ring 200 from counter-rotating. The resilient casing ring 200 is thus locked in position.

In the example embodiment shown, the resilient locking finger 230 is positioned axially (along the axis Z) facing or above the locking member 220, thus preventing counter-rotation of the resilient casing ring 200.

The locking member 220, in cooperation with the resilient finger 230 of the horological movement, allows the resilient casing ring 200 to be locked in the locked position and prevents any unexpected and involuntary disassembly of the resilient casing ring 200, for example under the effect of vibrations, successive expansion cycles, impacts, inadvertent use by the wearer, or the like.

The resilient casing ring 200 moves from the inserted position to the locked position, and vice-versa, by rotating by about 20°.

Once in the locked position, the resilient retaining lugs 250 bear against dedicated bearing portions 18 of the horological movement 10.

Advantageously, the locking of the resilient casing ring 200 by means of a bayonet connection, in particular by rotation about the axis Z, is reversible.

Disassembly of the resilient casing ring 200 preferably requires the use of a casing tool 400 to disengage the resilient finger 230 and release the locking member 220 so that it can rotate in the unlocking direction.

Preferably, the tool mentioned during assembly of the resilient casing ring 200 is also used for unlocking and disassembling the resilient casing ring 200. As described hereinabove, the tool comprises an unlocking pin 470 configured to cooperate with the resilient locking finger 230 and to stress it in an axial position relative to the axis Z, when the tool is held in position on the resilient casing ring 200 by the operator.

Generally speaking, the invention has been described with operations carried out by an operator. However, the invention can also be applied to a controller or a robot, such that the method for casing a horological movement according to the invention can be manual or automated.

The invention claimed is:

1. A resilient casing ring (200) for casing a horological movement (10) inside a watch case (100) comprising a middle (110), said resilient casing ring (200) comprising:

an annular body (205) with a central axis (Z), and fastening tabs (210) carried by said annular body (205) and configured to cooperate with said middle (110) to form a bayonet casing system (300) by the rotation of the resilient casing ring (200) relative to the middle (110) about the central axis (Z), between an insertion position and a locked position, and at least one resilient retaining element configured to cooperate with said horological movement (10) and exert an axial force parallel to the central axis (Z) on the horological movement (10) by elastic deformation of said resilient retaining element when said resilient casing ring (200) is in the locked position in the middle (110).

2. The resilient casing ring (200) according to claim 1, wherein the resilient casing ring (200) comprises a locking member (220) configured to cooperate with the horological movement (10) or the middle (110) to lock the resilient casing ring (200) in the middle (110) in the locked position in which the resilient casing ring is fixed against rotation.

3. The resilient casing ring (200) according to claim 2, wherein said locking member (220) is configured to cooperate with the horological movement (10) or the middle (110) to form an angular positioning stop for said resilient casing ring (200).

4. The resilient casing ring (200) according to claim 1, wherein said resilient casing ring (200) is made of a metal or polymer material.

5. The resilient casing ring (200) according to claim 1, wherein said at least one resilient retaining element is formed by the annular body (205).

6. The resilient casing ring (200) according to claim 1, wherein the at least one resilient retaining element comprises a plurality of resilient retaining elements formed by resilient retaining lugs (250) comprising a resilient portion (251) connected to the annular body (205) and shaped to undergo elastic deformation.

7. The resilient casing ring (200) according to claim 6, wherein said resilient portion (251) comprises a free contact end (252) having at least one portion (253) that is axially offset, in a direction parallel to the central axis (Z), from the annular body (205), configured to bear against the horological movement (10) and exert an axial force parallel to the central axis (Z) on the horological movement (10) by the elastic deformation of said resilient portion (251) at least when said resilient casing ring (200) is in the locked position in the middle (110).

8. The resilient casing ring (200) according to claim 1, wherein said resilient casing ring (200) further it-comprises a positioning coded element for assembling (245).

9. The resilient casing ring (200) according to claim 1, wherein said resilient casing ring (200) further comprises at least one recess (260, 270) configured to cooperate with a casing tool (400).

10. The resilient casing ring (200) according to claim 1, wherein said resilient casing ring (200) further comprises a first recess (260) configured to ensure rotation of the resilient casing ring (200) and a second recess (270) configured to ensure unlocking of said resilient casing ring (200), each of the recesses (260, 270) being configured to cooperate with a casing tool (400).

11. A watch case (100) comprising a middle (110), the resilient casing ring (200) according to claim 1 and a horological movement (10) cased inside said middle (110) by said resilient casing ring (10).

12. The watch case (100) according to claim 11, wherein the resilient casing ring (200) is configured to form damping means for the horological movement (10) in the event of impacts to the watch case (100).

13. The watch case (100) according to claim 11, wherein the middle (110) comprises bayonet grooves (113), said bayonet grooves (113) cooperating with said fastening tabs (210) to form the bayonet casing system (300) of the horological movement (10).

14. The watch case (100) according to claim 11, wherein the middle (110) comprises at least one bearing surface (111) for receiving said tabs (210) for fastening the resilient casing ring (200) in the insertion position thereof, which bear against said resilient casing ring (200).

15. The watch case (100) according to claim 11, wherein the resilient casing ring (200) comprises a locking member (220) and the middle (110) comprises a resilient locking finger (230) configured to cooperate with said locking member (220) to ensure that the resilient casing ring (200) is locked against rotation in the middle (110) by resilient clipping.

16. The watch case (100) according to claim 11, wherein the resilient casing ring (200) comprises a locking member (220) and the horological movement (10) comprises a resilient locking finger (230) configured to cooperate with said locking member (220) to ensure that the resilient casing ring (200) is locked against rotation in the middle (110) by resilient clipping.

17. A method for casing a horological movement (10) having a central axis (Z) in a watch case (100) comprising a middle (110) using a resilient casing ring (200) according to claim 1, comprising:

a step of inserting said horological movement (10) into the middle (110);

a step of inserting said resilient casing ring (200) over the horological movement along the central axis (Z);

a step of fastening the horological movement (10) to the middle (110), during which step the resilient casing ring (200) is rotatably engaged about the central axis (Z), said fastening tabs engaging within a plurality of bayonet grooves (113) in the middle (110) during the rotation of the resilient casing ring (200) until said resilient casing ring (200) reaches a locked position thereof.

* * * * *